Sept. 18, 1962 F. W. SCHMIDLIN ETAL 3,054,978

HEAT RESPONSIVE SUPERCONDUCTIVE SWITCHING DEVICES

Filed July 13, 1960 2 Sheets-Sheet 1

FREDERICK W. SCHMIDLIN
MICHAEL MAY
INVENTORS

BY [signature]
ATTORNEYS

Sept. 18, 1962 F. W. SCHMIDLIN ETAL 3,054,978

HEAT RESPONSIVE SUPERCONDUCTIVE SWITCHING DEVICES

Filed July 13, 1960 2 Sheets-Sheet 2

FREDERICK W. SCHMIDLIN
MICHAEL MAY
INVENTORS

BY Fraser and Bogucki
Morris Spector
ATTORNEYS

United States Patent Office
3,054,978
Patented Sept. 18, 1962

3,054,978
HEAT RESPONSIVE SUPERCONDUCTIVE SWITCHING DEVICES

Frederick W. Schmidlin, Redondo Beach, and Michael May, Santa Monica, Calif., assignors to Thompson Ramo Wooldridge, Inc., Canoga Park, Calif., a corporation of Ohio Filed July 13, 1960, Ser. No. 42,648
10 Claims. (Cl. 338—24)

This invention relates to electrical switching devices utilizing superconductive elements and more particularly to a new and improved electrical switching device in which a superconductor is switched between a superconductive condition and an electrically resistive condition in response to the generation of heat by a heating element, and in which the effects of switching noise and crosstalk produced by the switching operation are substantially eliminated.

In the investigation of the properties of materials at very low temperatures, it has been found that the electrical resistance of many materials either disappears or drops to such a low value as to be incapable of measurement when the temperature of the material is lowered to a value approaching absolute zero (0° Kelvin). In a state in which the material exhibits the aforementioned characteristics, the material is said to be superconductive.

The temperature at which a particular material changes from a normally electrically resistive condition to a superconductive condition is termed the transition temperature of the material. By raising and lowering the temperature of a superconductor, i.e. a conductor constructed of a material which is capable of becoming superconductive, an abrupt change in the value of its electrical resistance is obtained at the transition temperature. Thus, an electrical switching device may be constructed in which a superconductor is normally maintained at a temperature below the transition temperature and is heated by passing a current through an adjacent non-superconductive conductor to effect a switching operation. Unfortunately, however, in previously known devices operated in this fashion the heater current pulse induces a transient voltage in the switching element which appears as a spurious noise signal.

It will be appreciated that at the temperature of operation of a superconductive device, noise effects produced by thermal agitation of the molecules are substantially less than at ordinary temperatures. Therefore, an electrical switching device utilizing a superconductor as a switchable element possesses an inherent advantage with respect to thermal noise effects. However, the advantage of superconductive devices with respect to thermal noise effects is lost where spurious signals appear as a result of the switching operation.

Accordingly, it is an object of this invention to provide a new and improved electrical switching device utilizing superconductive components.

It is another object of this invention to provide an electrical switching device utilizing superconductive components which is substantially free of spurious signals.

Still another object of this invention is to provide an electrical switching device utilizing superconductive components of relatively small size and simple manufacture.

Yet another object of the invention is to provide a new and improved electrical signal switching system utilizing superconductive components.

In accordance with one aspect of the invention, an electrical switching device is provided in which a magnetically impermeable shield is positioned between a heating element and a superconductor, with the shield performing the dual function of transmitting heat from the heating element to the superconductor and substantially eliminating all magnetic coupling between the heating element and the superconductor. By this means, the superconductor may be switched in response to the heat generated by the heating element without introducing spurious signals in the superconductor which would otherwise appear in response to electrical current flow through the heating element.

In one particular embodiment of the invention, a sandwich structure is provided incorporating a central heating element positioned between a pair of magnetically impermeable shield layers with a pair of dielectric layers overlying the the shield layers. Deposited on the outer surface of both dielectric layers are materials forming one or more superconductors which are switched from a superconductive condition to an electrically resistive condition in response to the heat generated by current flow through the heater element and passed by the shield layers.

In accordance with another aspect of the invention, an arrangement is provided for performing a switching operation with respect to multiple electrical signals in which a transmission line is connected to selected ones of a plurality of signal sources by the operation of superconductive switching devices, each including multiple superconductors, magnetically impermeable shield layers, and a heating element as described above. By selectively passing current through the heating elements of the switching devices, the signal sources may be individually connected and disconnected from the transmission line.

A better understanding of the invention may be had from a reading of the following detailed description and an inspection of the drawings, in which:

FIG. 5(*b*) is a schematic circuit diagram of the switch element of FIG. 5(*a*);

Figures 1, 2, 4, 5A:
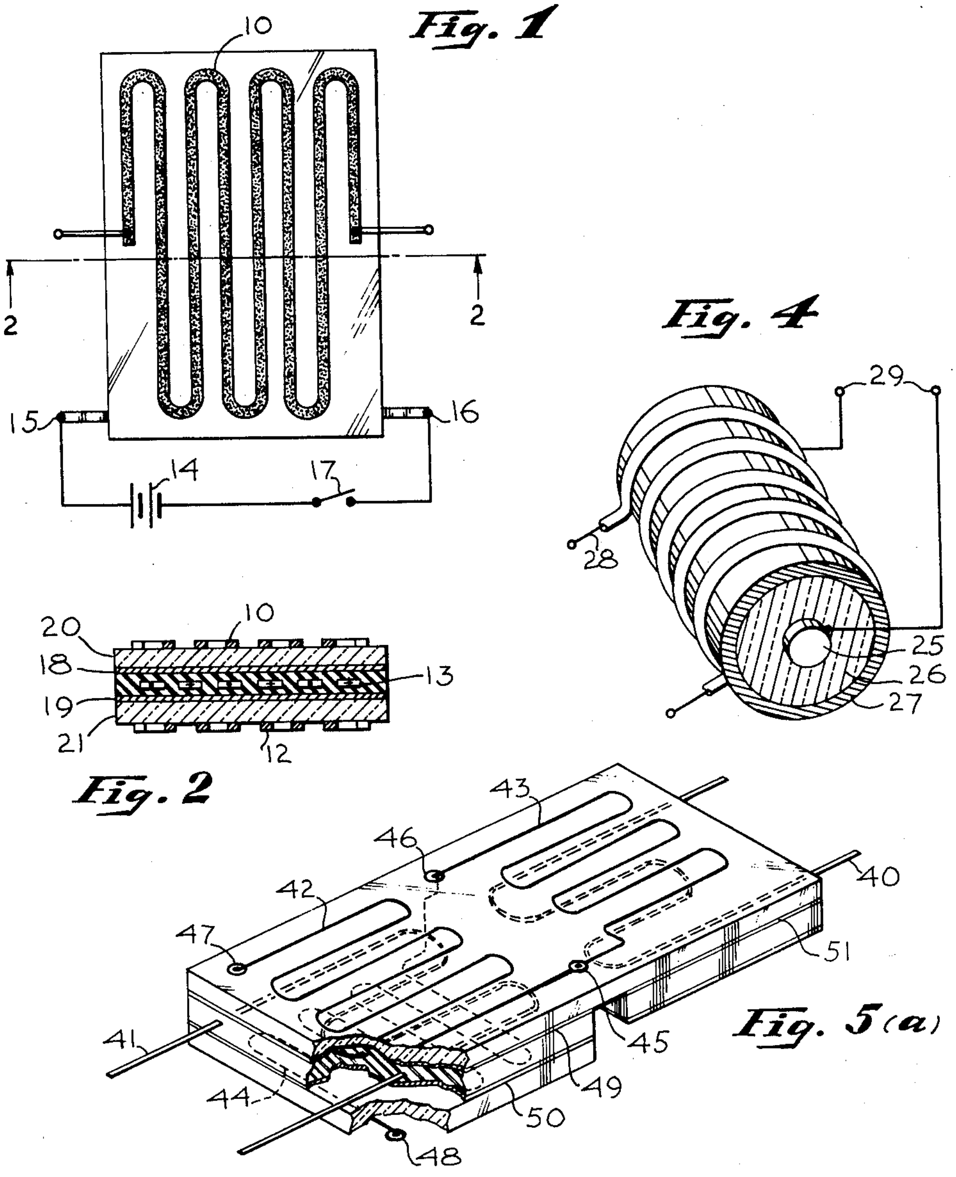
FIG. 1 is a plan view of an electrical switching device in accordance with the invention.
FIG. 2 is a sectional view taken along the line 2—2 of FIG. 1.
FIG. 4 is a perspective view of an alternative arrangement in accordance with the invention.

In FIG. 1 of the drawings, and in the sectional view of FIG. 2, there is illustrated an electrical switching device in accordance with the invention in which two separate superconductors 10 and 12 are each adapted to be switched between a superconductive condition and an electrically resistive condition in response to current flow through a heating element 13 (FIG. 2). By constructing the superconductors 10 and 12 of suitable materials having a transition temperature slightly above the temperature of operation of the device, each of the superconductors 10 and 12 will remain in a superconductive condition so long as the heating element 13 does not receive current.

Although any suitable electrical signal may be applied to the heating element 13 to perform a switching operation, there is illustrated diagrammatically in FIG. 1 a simple arrangement in which a battery 14 is connected across a pair of end terminals 15 and 16 connected to the heating element 13 whenever a switch 17 is closed. It will be appreciated that other types of currents may be passed through the heating element 13 as well, such as for example alternating currents and electrical impulses.

By constructing the heating element 13 of conventional electrically resistive materials which remain electrically resistive at the temperature of operation of the device, the passage of current through the heating element 13 produces heat energy which elevates the temperature of the device by virtue of the fact that the heating element 13 is thermally coupled to the superconductors 10 and 12 through a pair of magnetically impermeable shield layers 18 and 19 (FIG. 2) and a pair of dielectric electrical insulation layers 20 and 21.

It will be appreciated that current flow through the heating element 13 is accompanied by the generation of a magnetic field which might be expected to link the superconductors 10 and 12 so as to induce therein electrical currents by transformer action. Such an effect does occur in previously known arrangements for effecting a switching operation where a heating element is positioned adjacent a superconductor. However, in the arrangement of the invention illustrated in FIGS. 1 and 2, the magnetically impermeable layers 18 and 19 function to block the passage of magnetic fields generated by current flow through the heating element 13 while at the same time performing the function of transmitting heat between the heating element 13 and the superconductors 10 and 12. For this purpose, the magnetically impermeable shields 18 and 19 may each be constructed of a material which is superconductive at the temperature of operation of the device.

So long as the transition temperature of the shields 18 and 19 is properly selected with reference to the transition temperature of the superconductors 10 and 12, the shields 18 and 19 will remain superconductive irrespective of whether or not the superconductors 10 and 12 are switched to an electrically resistive condition. Since a good many superconductive materials are metals, the shields 18 and 19 may be arranged to function as efficient heat conductors. Furthermore, in accordance with the Meissner effect, a superconductive material is an essentially perfect magnetic shield so long as the material remains in a superconductive condition. Accordingly, the magnetic shields 18 and 19 perform the dual function of conducting heat between the heating element 13 and the superconductors 10 and 12 while at the same time blocking the passage of magnetic fields so that spurious signals cannot be generated in the superconductors 10 and 12 as a result of a switching operation which produces magnetic fields surrounding the heating element 13.

With respect to the dielectric layers 20 and 21, suitable materials may be employed which retain their electrical insulating capabilities at the temperature of operation of the device. In order to achieve an efficient switching operation, the layers 20 and 21 should be as thin as possible so as to establish an intimate relationship between the superconductors 10 and 12 and the heat transmitting shields 18 and 19 while at the same time maintaining their electrical insulation capability. Each of the superconductors 10 and 12 may be vacuum deposited on the surface of the dielectric layers 20 and 21 so as to provide a sandwich type construction. Furthermore, the heater element 13 is preferably an evaporated circuit of a non-superconductive metal which is insulated so as to preclude any electrical connection between the heater element 13 and the shield layers 18 and 19.

Figures 3, 6, 7:
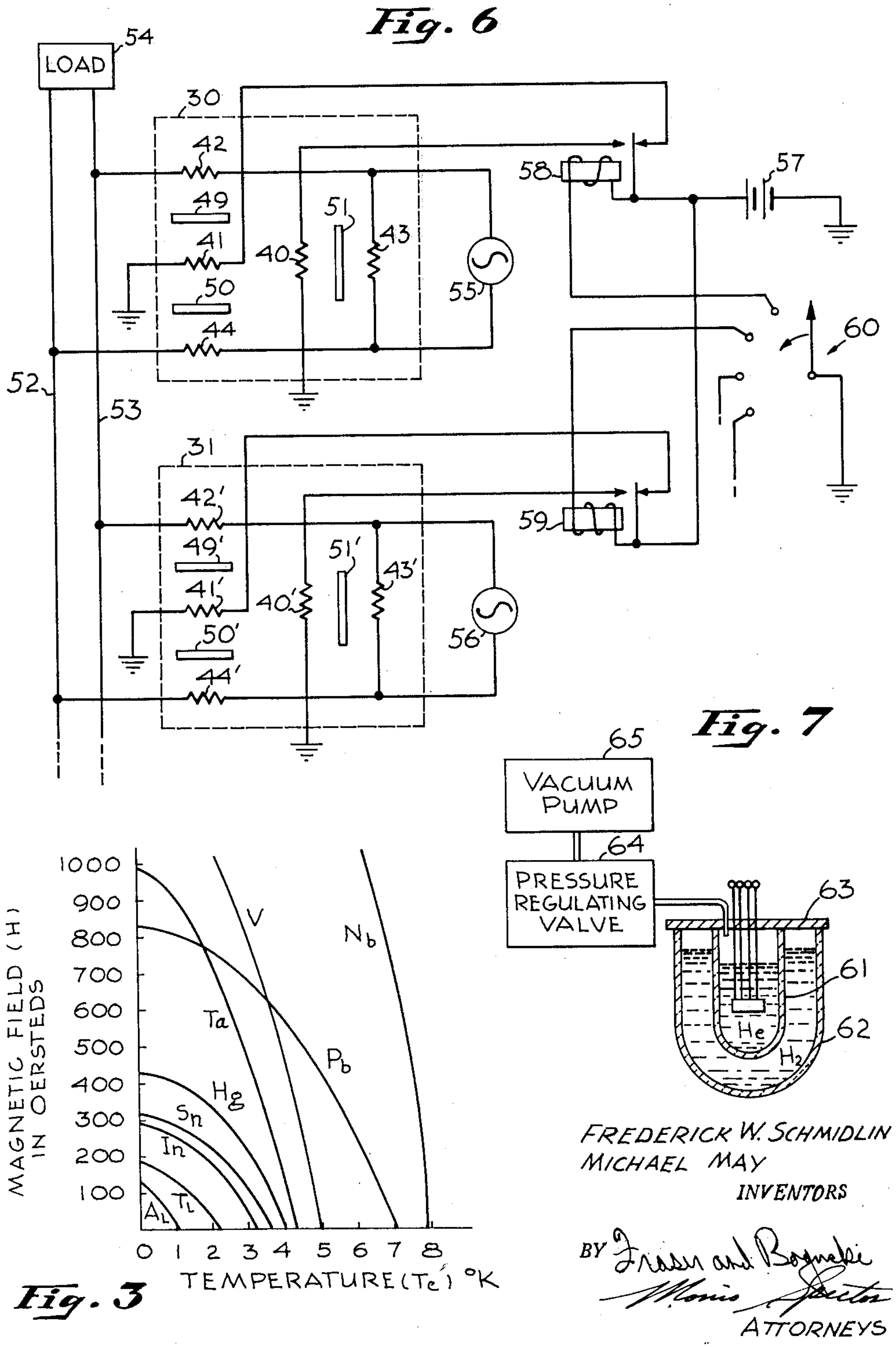
FIG. 3 is a graphical illustration in which the transition temperatures of several different superconductive materials are plotted as a function of the strength of an applied magnetic field.
FIG. 6 is a schematic circuit diagram of a signal multiplexing arrangement utilizing a plurality of electrical switching devices in accordance with the invention.
FIG. 7 is a diagrammatic illustration of one suitable arrangement for maintaining electrical switching devices in accordance with the invention at a suitable temperature of operation near absolute zero (0° Kelvin).

As noted above, the transition temperature at which a superconductive material changes from its superconductive condition to an electrically resistive condition is dependent upon the strength of an applied magnetic field. The manner in which the transition temperature of various materials changes as a function of a change in the strength of an applied magnetic field is shown in FIG. 3 for the materials niobium, tantalum, lead, mercury and tin. Since the transition temperature for a material is dependent upon the applied magnetic field, reaching a maximum in the absence of a magnetic field, the magnetically impermeable shield layers 18 and 19 of the device of FIGS. 1 and 2 are advantageously maintained in the region of superconductivity by suitably limiting the magnitude of any applied magnetic field. Should a magnetic field be applied of sufficient magnitude to drive the shield layers 18 and 19 out of the superconductivity region, the effectiveness of the shielding will be diminished.

Referring to the graphical illustration of FIG. 3, so long as the combination of temperature and magnetic field strength falls below the curve for a given material, a superconductive condition is maintained. However, for combinations of temperature and magnetic field strength above the curve for the given materials, an electrically resistive condition obtains. Since the superconductors 10 and 12 (FIG. 2) are to be switched between a superconductive condition and an electrically resistive condition in response to a change of temperature produced by heat generated by current flow through the heating element 13 while at the same time the shield layers 18 and 19 are to be maintained superconducting, it follows that a material should be selected for the shield layers 18 and 19 having a transition temperature higher than that of the material of the superconductors 10 and 12.

Referring again to FIG. 2, it may be seen that the shield layers 18 and 19 may be constructed of lead while the superconductors 10 and 12 may be constructed of tin inasmuch as the transition temperature for lead is higher than that for tin for all strengths of an applied magnetic field. Also, it may be seen from FIG. 3 that lead remains superconducting for many combinations of temperature and applied magnetic field strength in excess of those at which tin switches to an electrically resistive condition. Therefore, in FIG. 2, so long as the magnetic fields generated by current flow through the heater element 13 do not operate in conjunction with the temperature of the shield layers 18 and 19 to switch the layers 18 and 19 to an electrically resistive condition, heat energy may be passed by the layers 18 and 19 to the superconductors 10 and 12 to effect a switching operation while at the same time preserving a magnetic shield between the heating element 13 and the superconductors 10 and 12.

Assuming that the temperature of operation of the device is 3.5° Kelvin, and that the materials tin and lead are used for the superconductors 10 and 12 and the layers 18 and 19 respectively, the passage of a current through the heating element 13 will effect a switching operation of the superconductors 10 and 12 when the temperature of the superconductors is elevated to the point at which the curve intersects the abscissa i.e. approximately 3.7° Kelvin. On the other hand, so long as the temperature of the shield layers 18 and 19 does not, when taken in conjunction with the magnetic fields generated by the current flow through the heating element 13, fall above the curve of FIG. 3 for lead, the shield layers 18 and 19 will remain superconductive. For example, the temperature of the shield layers when constructed of lead may rise as high at 4° Kelvin so long as the field strength does not exceed 500 oersteds.

In one particular embodiment, the superconductors 10 and 12 may comprise vacuum deposited strips of tin having a thickness of the order of 500 angstrom units. The dielectric layers 20 and 21 may be constructed of a material such as silicon monoxide of the order of $2.5\times10^{-3}$ centimeters thick while the shields 18 and 19 may be constructed of lead having a thickness of the order of $4\times10^{-5}$ centimeters. For electrical insulation purposes, the heater element 13 may be covered with a dielectric layer of approximately 1000 angstrom units in thickness. With the above construction, the device is capable of responding at a rate of 50,000 cycles per second so that the switching time is of the order of $2\times10^{-5}$ seconds. However, it will be appreciated that the switching speed is a function of the thermal properties of the device which are in turn dependent upon the thickness of the various layers. Accordingly, the speed of switching may be increased by a reduction in the thickness of the various layers if desired.

In FIG. 4 there is illustrated an alternative structure of an electrical switching device in accordance with the invention in which the elements are coaxially arranged. A cylindrical superconductor 25 forms the core of the device with a dielectrical electrical insulation layer 26 surrounding the superconductor 25. A shield layer 27 surrounds the dielectric layer 26 with an insulated heating element 28 being wound in a helix around the insulating layer 27.

In operation, the device of FIG 4 is similar to that described above in connection with FIGS. 1 and 2. Accordingly, passage of current through the heating element 28 generates heat energy which is transmitted to the superconductor 25 via the dielectric insulation 26 and the magnetically impermeable shield 27. As before, with a proper selection of materials, the shield 27 functions to transmit heat energy while blocking the passage of magnetic fields so that transformer action between the heating element and the superconductor is substantially eliminated. With the device in one condition of operation, substantially zero electrical resistance appears between the terminals 29 of the superconductor 25 while in a second condition of operation the generation of heat by the heating element 28 produces a condition in which the superconductor 25 presents electrical resistance to the flow of current between the terminals 29. A particular advantage of the coaxial arrangement of FIG. 4 is that the shield layer 27 completely surrounds the superconductor 25 except insofar as the superconductor 25 may protrude from the ends of the device. Accordingly, a complete shielding from the magnetic fields of the heater element is provided as well as from the earth's magnetic field and stray magnetic fields which may be present due to the presence of adjacent electrical apparatus. Accordingly, the transition temperature of the superconductor 25 is that which is defined by the intersection of the curve of the selected material with the abscissa in the graphical illustration of FIG. 3. As before, the superconductor 25 may be constructed of tin with the shield 27 being constructed of lead.

Figure 5B:
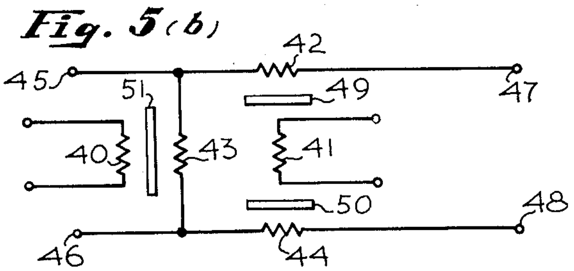
FIG. 5(*a*) is a diagrammatic representation of a three element superconductive switch assembly in accordance with the invention.

Although the electrical switching devices described above and shown in connection with FIGS. 1, 2 and 4 may be employed to advantage in any type of electrical system in which a switching function is desired and where the devices are maintained at the proper operating temperature, a particular dual channel switch especially adapted for use in a signal multiplexing system is illustrated in FIG. 5(*a*) with a corresponding schematic circuit diagram being shown in FIG. 5(*b*).

The arrangement of FIG. 5(*a*) includes a sandwich of switch elements, insulating layers, magnetically impermeable shields, and heater elements similar to that shown in FIGS. 1 and 2. However, the arrangement includes two separate heating elements 40 and 41 and three separate switchable superconductors 42, 43 and 44. The superconductors 42—44 are connected in a four terminal network between the terminals 45, 46, 47 and 48 as shown in FIG. 5(*b*). A heating element 41 is adapted to elevate the temperature of the superconductors 42 and 44 while the heating element 40 is adapted to elevate the temperature of the superconductor 43. The superconductors 42 and 44 may be positioned on opposite sides of the sandwich construction of FIG. 5(*a*) with magnetically impermeable shields 49 and 50 being suitably disposed between the heating element 41 and the superconductors 42 and 44 so as to transmit heat energy while blocking the passage of magnetic fields. In similar fashion, a magnetically impermeable shield 51 may be positioned between the heating element 40 and the superconductor 43 for the transmission of heat energy while blocking the passage of magnetic fields.

In the construction of FIG. 5(*a*), thermal isolation between a first section including the heater 40 and the element 43 and a second section including the heating element 41 and the superconductors 42 and 44 may be provided by means of a separation between the shield layers 49—51 so as to minimize the transmission of heat energy along the length of the device between the two separate sections. By this means, a substantially independent operation of the two separate sections may be achieved.

In the operation of a device in accordance with FIGS. 5(*a*) and 5(*b*), it is contemplated that the heating elements 40 and 41 will be alternately energized so that in one condition of operation there exists between the terminals 45 and 46 a substantial short circuit by virtue of the superconductive condition of the superconductor 43 while at the same time superconductors 42 and 44 are rendered electrically resistive to present an impedance between the terminals 47 and 48. On the other hand, in the opposite condition of energization, the superconductor 43 is rendered electrically resistive to present an impedance between the terminals 45 and 46 while the superconductors 42 and 44 are maintained in a superconductive condition so that substantially zero impedance appears between the terminals 45 and 47 and between the terminals 46 and 48.

The electrical switching device shown in FIGS. 5(*a*) and 5(*b*) may be used to advantage in a signal multiplexing system such as that shown in FIG. 6 wherein two separate such devices 30 and 31 are shown, although it will be understood that any suitable number of such devices may be employed in the system as desired. The signal multiplexing arrangement of FIG. 6 is adapted to operate in conjunction with a transmission line comprising a pair of conductors 52 and 53 which are terminated in a suitable load impedance 54. Since the switching devices 30 and 31 may be identical in circuit configuration with that shown in FIG. 5(*b*) the same numerical designations have been employed for the various parts. For the purpose of distinguishing switch 31 from switch 30, each of the numerical designations of the switch 31 includes a prime mark (′) e.g., heating element 40′.

In operation, the system of FIG. 6 functions to sequentially connect each of a plurality of separate signal sources to the transmission line conductors 52 and 53. Accordingly, there are shown in FIG. 6 a first signal source 55 connected to the electrical switching device 30 and a second electrical signal source 56 connected to the electrical switching device 31. Energizing current for the heater elements of the various switches may be derived from a suitable source such as that indicated diagrammatically as a battery 57. By means of a plurality of relays each having single pole double throw contacts, the heater elements of each switch may be alternately energized. In connection with the switching device 30, a relay 58 is connected so as to pass current from the source 57 through the heating element 41 in one position and through the heating element 40 in another position. Similarly, a relay 59 is connected between the switching device 31 and the source 57 for alternately energizing the heating elements 40′ and 41′. By selectively energizing the relays 58 and 59 the electrical switching devices 30 and 31 may be operated to connect a selected one of the sources 55 and 56 to the transmission line conductors 52 and 53. For this purpose, there is illustrated in FIG. 6, by way of example, a rotary switch 60 which functions to selectively connect one of the relays 58 and 59 to ground reference potential, thereby enabling the selected relay to be energized from the source 57. As the rotary switch 60 turns, each of the switching devices 30 and 31 is energized in sequence to connect its associated signal source to the transmission lines 52 and 53.

A particular feature of advantage of the arrangement of FIG. 6 is that the electrical resistance of the superconductors of each of the several switching devices may be selected so as to preserve a proper impedance matching relationship with respect to the transmission line. Thus, with respect to the switching device 30, with the heating element 41 being energized, the superconductors 42 and 44 are electrically resistive and the superconductor 43 presents a substantially zero impedance across the source 55. Accordingly, the impedances afforded by the superconductors 42 and 44 effectively isolate the signal source 55 from the transmission line. On the other hand, when the heater element 40 is energized, the superconductor 43 becomes electrically resistive so that the signal from the source 55 appears across the impedance presented by the superconductor 43. At the same time, the superconductors 42 and 44 are in a superconductive condition so that the signal from the source 55 is applied to the transmission line conductors 52 and 53 without attenuation. Therefore, as the rotary commutator 60 proceeds to selectively energize each of the switches via their associated energizing relays, the sources 55 and 56 may be individually connected to the transmission line without interaction between the sources and with a proper impedance relationship.

Where the resistance of the superconductor 43 in an electrically resistive condition is made equal to the total of the resistances of the superconductors 42 and 44 in an electrically resistive condition, and assuming that the source 55 possesses a relatively high impedance, the impedance presented to the transmission line by each of the switching devices is the same in both conditions of operation so that the switching in and out of the various signal sources does not disturb the transmission line. Furthermore, by virtue of the advantages of the electrical switching devices of the invention in eliminating transformer action between the heater elements and the superconductors, substantially no spurious signals are transferred to the transmission line by the switching operation. Accordingly, the full benefit of the low amount of thermal noise present in superconductive devices may be achieved without the presence of spurious signals being introduced by the switching operation.

One suitable arrangement for maintaining electrical switching devices in accordance with the invention at a proper operating temperature is shown in FIG. 7. The apparatus of FIG. 7 comprises a double Dewar flask having an inner container 61 which may be filled with liquid helium and an outer container 62 which may be filled with liquid hydrogen. Apparatus including the electrical switching device of the invention may be positioned within the inner container 61 with electrical connections being made through the top 63 of the apparatus. By means of a pressure regulating valve 64 and a vacuum pump 65, the liquid helium may be maintained at a proper operating temperature near absolute zero.

Although there have been described above various specific arrangements of electrical switching devices and signal multiplexing systems in accordance with the invention to illustrate the manner in which the principles of the invention may be used to advantage, it will be appreciated that the invention is not limited to the particular examples shown. Accordingly, the invention should be considered to include any and all modifications, variations, alternatives or equivalent arrangements falling within the scope of the annexed claims.

What is claimed is:

1. An electrical switching device comprising a superconductor having a given transition temperature, a magnetically impermeable shield electrically insulated from said superconductor, said shield being constructed of a superconductive material having a higher transition temperature than said given transition temperature, and a heating element positioned to radiate heat through said shield to said superconductor whereby said superconductor may be switched to an electrically resistive condition in response to current flow through said heating element with said shield being in a superconductive condition.

2. An electrical switching device comprising a first superconductor having a given transition temperature, a shield electrically insulated from and thermally coupled to said superconductor, said shield having a higher transition temperature than said given transition temperature, and an electrically resistive heating element positioned adjacent said shield whereby said superconductor is switched to an electrically resistive condition in response to current flow through said heating element, with said shield forming a barrier for magnetic fields between said heating element and said superconductor.

3. An electrical switching device comprising a superconductor having a given transition temperature, a shield electrically insulated from said superconductor, said shield being constructed of a superconductive material having a higher transition temperature than said superconductor, means thermally coupling said shield to said superconductor, an electrically resistive heating element positioned adjacent said shield, and means for passing current through said heating element to elevate the temperature of said superconductor, whereby said superconductor is switched to its electrically resistive condition while said shield remains superconductive to provide a magnetically impermeable barrier between the heating element and the superconductor.

4. An electrical switching device comprising a superconductor having a given transition temperature, a shield of superconductive material thermally coupled to said superconductor, said shield having a higher transition temperature than said given transition temperature, an electrically resistive heating element positioned adjacent said shield, and means for selectively passing current through said heating element to switch said superconductor from a superconductive to an electrically resistive condition, whereby said super-conductor is switched to an electrically resistive condition at a temperature at which said shield remains superconductive to block the passage of magnetic fields produced by current flow through said heating element.

5. An electrical switching device comprising a dielectric plate, a superconductor constructed of a material exhibiting superconductive properties below a given transition temperature supported on one face of said dielectric plate, a shield layer thermally coupled to said dielectric plate, said shield being constructed of a material exhibiting superconductive properties and having a higher transition temperature than the material of said superconductor, and a heating element positioned adjacent said shield layer on a side thereof remote from said superconductor whereby said superconductor is selectively switched to an electrically resistive condition in response to heat from said heating element while said shield remains in a superconductive condition.

6. An electrical switching device comprising a dielectric plate, a strip of material exhibiting superconductive properties below a first given transition temperature deposited on one face of said dielectric plate, a layer of material exhibiting superconductive properties below a second given transition temperature higher than the said first given transition temperature thermally coupled to said dielectric plate, a resistance heating element thermally coupled to said layer for efficient thermal conduction through said layer and said dielectric plate, and means selectively passing current through said resistance heating element whereby heat radiated by said heating element switches said strip to an electrically resistive condition at a temperature at which said layer remains superconductive so as to shield said strip from magnetic fields produced by the passage of current through said resistance heating element.

7. An electrical switching device in accordance with claim 6 wherein said strip is constructed of tin and said layer is constructed of lead.

8. A dual channel electrical switching device comprising a pair of dielectric plates in spaced juxtaposition, a pair of superconductors supported on the outer faces of said dielectric plates and having a given transition temperature, a pair of superconductive shield layers engaging the inner faces of said dielectric plates, said shields having a higher transition temperature than said given transition temperature, and a resistance heating element mounted between said shields in thermally coupled relation therewith, whereby said superconductors are rendered electrically resistive in response to the passage of current through said resistance heating element while said shields remain in a superconductive condition to block the passage of magnetic fields between said heating element and said superconductors.

9. An electrical switching device comprising a pair of dielectric plates positioned in spaced parallel relationship, a plurality of separate superconductors supported on the outer faces of said dielectric plates, a pair of spaced magnetically impermeable shield layers thermally coupled to the inner faces of said dielectric plates, and a resistance heating element positioned between said dielectric plates in thermally coupled relationship with said shield layers whereby said superconductors may be switched to an electrically resistive condition substantially free of the effects of magnetic fields produced by current flow through the heating element.

10. An electrical switching device comprising a pair of parallel dielectric plates, first and second superconductor elements supported on the outer face of one of said dielectric plates, a third superconductor element supported on the outer face of the other of said dielectric plates, said first, second and third superconductor elements having a given transition temperature, first, second and third superconductive shield layers engaging the inner faces of said dielectric plates opposite said first, second and third superconductor elements respectively, said shield layers having a transition temperature higher than said given transition temperature and said first and second superconductive shield layers being spatially separated, a first resistance heating element between said first and third superconductive shield layers and thermally coupled thereto, a second resistance heating element thermally coupled to said second superconductive shield layer, and means for selectively energizing said resistance heating elements for controlling the resistance of said superconductor elements without heating the superconductive shield layers above said higher transition temperature.

References Cited in the file of this patent

UNITED STATES PATENTS

| | | |
|---|---|---|
| 2,189,122 | Andrews | Feb. 6, 1940 |
| 2,936,435 | Buck | May 10, 1960 |
| 2,973,441 | Courtney-Pratt | Feb. 28, 1961 |